US012555064B2

(12) United States Patent
Carlson et al.

(10) Patent No.: US 12,555,064 B2
(45) Date of Patent: Feb. 17, 2026

(54) TECHNOLOGIES FOR RETRIEVING AND ANALYZING SHIPPING DATA AND RENDERING INTERFACES ASSOCIATED THEREWITH

(71) Applicant: PROJECT44, LLC, Chicago, IL (US)

(72) Inventors: Quintin C. Carlson, Chicago, ID (US); Michael B. Wey, Austin, TX (US); Andrew Dash, Berkeley, CA (US); Nanxin Zhao, Redwood City, CA (US)

(73) Assignee: PROJECT44, LLC, Chicago, IL (US)

( * ) Notice: Subject to any disclaimer, the term of this patent is extended or adjusted under 35 U.S.C. 154(b) by 0 days.

(21) Appl. No.: 18/377,607

(22) Filed: Oct. 6, 2023

(65) Prior Publication Data
US 2024/0119403 A1    Apr. 11, 2024

Related U.S. Application Data

(60) Provisional application No. 63/378,676, filed on Oct. 6, 2022.

(51) Int. Cl.
*G06Q 10/0833* (2023.01)
(52) U.S. Cl.
CPC ................. *G06Q 10/0833* (2013.01)
(58) Field of Classification Search
CPC .................................................. G06Q 10/0833
See application file for complete search history.

(56) References Cited

U.S. PATENT DOCUMENTS

| 8,214,747 B1 * | 7/2012 | Yankovich | ............ G06F 9/4451 |
| | | | 715/810 |
| 2005/0197892 A1 * | 9/2005 | Bilibin | ................... G06Q 10/08 |
| | | | 705/13 |

(Continued)

OTHER PUBLICATIONS

Google Workspace for Developers "Cards" last updated Feb. 12, 2021 (available at: https://web.archive.org/web/20210327041748/https://developers.google.com/workspace/add-ons/concepts/cards)(Year: 2021).*

*Primary Examiner* — Rupangini Singh
*Assistant Examiner* — Stephanie S. Wallick
(74) *Attorney, Agent, or Firm* — MARSHALL, GERSTEIN & BORUN LLP

(57) ABSTRACT

Systems and methods for retrieving and analyzing shipping data and rendering interfaces associated therewith are disclosed herein. An example method includes receiving an indication of a reference key from a user computing device, and aggregating, by utilizing one or more application programming interfaces (APIs), a set of data entity information from one or more shipping service provider devices. The set of data entity information may correspond to the reference key and include real-time data from each shipping service provider participating in logistics or transportation of an object from the set of data entity information along a transportation route. The example method may further include partitioning the data entity information into multiple workspace cards, and causing the user computing device to render a workspace graphical user interface (GUI) that includes at least one workspace card of the multiple workspace cards for access by a user of the user computing device.

18 Claims, 14 Drawing Sheets

(56) References Cited

U.S. PATENT DOCUMENTS

| | | | | |
|---|---|---|---|---|
| 2015/0015407 | A1* | 1/2015 | Markwitz | G06Q 10/00 340/691.6 |
| 2015/0324741 | A1* | 11/2015 | Parry | G06Q 10/0833 705/333 |
| 2017/0053234 | A1* | 2/2017 | Lozito | G06Q 10/0833 |
| 2020/0265379 | A1* | 8/2020 | Walker | G06Q 10/0833 |
| 2021/0056504 | A1* | 2/2021 | Scott | G06Q 10/0838 |
| 2021/0081882 | A1* | 3/2021 | Franklin | G06Q 10/087 |
| 2022/0207449 | A1* | 6/2022 | Cooks | G06Q 10/0833 |
| 2022/0292584 | A1* | 9/2022 | Kumar | H04L 9/3213 |

* cited by examiner

Order 2345-N

Order #2345-N

Overview — *312a*

| Status | | |
|---|---|---|
| Partially Demand | Actual Aug 17, 2022 Delay 2 Days | Scheduled Aug 15, 2022 |

■ Origin
□ Destination

Vendor     Consignee

Related References
Shipments (10)
66%
2 Exceptions Complete

① 54432-A ✎ ① 23E8760 ↗ ① NOYCR2M09 ↗

Containers (380)
80%
2 Exceptions Complete

① CONT300821 ↗ ① CONT2366312 ↗ ① CONT9763443 ↗
① CONT9618023233 ↗ ① CONT37824545 ↗ ① CONT282989 ↗

▸ Show All

---

Activity Feed    All Events ▾ — *312b*

1:55AM

🕐 1 New Task    Today, 7 Aug, 2022 7:00 CST
Review Orde #2345-N And Acknowledge Risk
[ Acknowledge ] [☒ Snooze ]

⚠ 1 New Task    Today, 7 Aug, 2022 7:00 CST
Los Angeles Port And Long Beach Port Has a 21 Day Delay congestion, Putting This Order At Risk

Yesterday

1D   Reached Crossdock    6 Aug, 2022 14:00 CST
This Shipment Reached The Cfrossdock In Compton CA With

Jul 18

1C   Transshipment Complete    18 Jul, 2022 8:00 CST
Transshipment Completed In Kappa Japan With 🕐 Task Complete    18 Jul, 2022 8:00 CST
Review Order #2345-N And Acknowledge Risk
↶ Undo

---

Shipments — *312c*

| ID# | Origin/Destination | Status | |
|---|---|---|---|
| 54432-A | | In Transit | ˅ |
| 54432-B | | At Stop | ˅ |
| 54432-C | | Delivered | ˅ |
| 54432-A | | In Transit | ˅ |
| 54432-B | | At Stop | ˅ |
| 54432-A | | In Transit | ˅ |
| 54432-A | | In Transit | ˅ |
| 54432-A | | In Transit | ˅ |
| 54432-A | | In Transit | ˅ |

Route | Collaps ✏

◯ 1/13 Stops Completed     Last event 4 Mar 2022 12:57

Pickup ▲

ATD Jul 30

| Event | Requested | Initial Planned | Latest Planned | ✵ p44 Predicts | Actual |
|---|---|---|---|---|---|
| Arrival | Jul 26 2022, 10:30 | Jul 27 2022, 10:30 | ... | ... | Jul 29, 2022 10:44 +15 h |
| Departure | ... | Jul 28 2022, 11:17 | ... | ... | Jul 31, 2022 12:57 +20 h |

Transportation Mode Not Provided Yet

Stop ▲

Port Of Los Angeles     ATD Jul 31
425 S. Palos Verdes St., San Pedro, CA 90731     +20 h

| Event | Requested | Initial Planned | Latest Planned | ✵ p44 Predicts | Actual |
|---|---|---|---|---|---|
| Arrival | Jul 28 2022, 10:30 | Jul 28, 2022, 10:30 | ... | ... | Jul 29, 2022 10:44 +15 h |
| Departure | ... | Jul 30, 2022, 11:17 | ... | ... | Jul 31, 2022 12:57 +20 h |

Transit ▲

| Event | Actual |
|---|---|
| Not Receiving Data | Aug 7, 2022 4:03 |
| In Transit-Idle | Aug 8, 2022 9:27 |
| In Transit-Idle | Aug 12, 2022 9:52 |
| In Transit-In Motion | Aug 12, 2022 10:44 |

Stop ▲

Port Of Los Angeles     ATD Jul 31
425 S. Palos Verdes St., San Pedro, CA 90731     +20 h

| Event | Requested | Initial Planned | Latest Planned | ✵ p44 Predicts | Actual |
|---|---|---|---|---|---|
| Arrival | Aug 9, 2022, 10:30 | Aug 10, 2022, 10:30 | ... | ... | Aug 12, 2022 10:44 +15 h |
| Departure | ... | Aug 18, 2022, 11:17 | ... | ✵Aug 21, 2022 12:57 +1 d | |

Transit ▲

Delivery ▲

ETA Aug 21
+2 d

| Event | Requested | Initial Planned | Latest Planned | ✵ p44 Predicts | Actual |
|---|---|---|---|---|---|
| Arrival | Aug 17, 2022, 10:30 | Aug 19, 2022, 10:30 | ... | ✵Aug 21, 2022 12:57 +1 d | ... |
| Departure | ... | Aug 19, 2022, 11:17 | ... | ✵Aug 21, 2022 12:57 +1 d | ... |

⊙ Shipment Complete

Order #21-31745 | Shipment #21-12157-B ✕ | Share Session | Search

350

Overview — Arriving 2 Days Late
352

ETA
Dec 12, 2021 12:35pm CST
Roll - Delay

Confidence
85%

■ Origin
□ Destination

Supplier Name
(555) 555-5555

Vendor Name
(555) 555-5555

Related References

Bookings: 99268315414 | 4585734957

Orders: 99268315414 | 4585734957 | 1234335

Activity Feed — All Events ▾

Schedule  Assign  Complet

■ Milestone 22 Completed — 10:00 CST November 30, 2021

■ Milestone YY Completed — 10:00 CST November 30, 2021

354

▲ Delay — 06:00 CST December 08, 2021

💡 Insights
Due To Delay At the Long Beach Port, The Shipment Is 15% Likely So Be Delayed 20 hrs And Miss The Appoint Window ⏱ Suggested Task
Rebock Delivery Window
[ Create Task ] [ Dismiss ]

Route — View Route Guide

A-B

■ Kyoto, JP

■ Porter Discharge
Long Beach, CA

● Crossbock
Compton, CA
356

24 Previous Shipments
In Transit-In Motion
00 Jul 2021-00:00 EST - 2 Day Delay
In Transit-Idle
00 Jul 2021-00:00 EST □ Destination ⓘ Estimate 36hr Delay ⓘ Triage Exceptions On N-12057-C    [ Complete > ]    < 2/3 >

TECHNOLOGIES FOR RETRIEVING AND ANALYZING SHIPPING DATA AND RENDERING INTERFACES ASSOCIATED THEREWITH

CROSS-REFERENCE TO RELATED APPLICATIONS

This application claims priority to U.S. Provisional Application No. 63/378,676 entitled "Technologies for Retrieving and Analyzing Shipping Data and Rendering Interfaces Associated Therewith," filed on Oct. 6, 2022, the disclosure of which is hereby incorporated herein by reference.

BACKGROUND

When shipping goods, consumers frequently desire to track their shipments to ensure it will arrive at the correct location, on-time, and in pristine condition. Consumers or entities shipping objects across vast distances or a large volume of objects at one time may require more detailed tracking, as these shipments may utilize multiple service providers (e.g., airplane/vehicle/ship transportation), and may otherwise encounter significant logistical challenges. As such, development of technologies that can reliably provide relevant, actionable logistics data from service providers is a topic of great interest in the field of shipping/data logistics.

However, conventional shipping logistics technologies suffer from several drawbacks that prevent them from providing such reliable, relevant, and actionable logistics data. In particular, conventional techniques force consumers to perform independent analysis of how/why a particular shipment may experience delay, re-routing, or other issues. Consumers are typically forced to navigate a panoply of various websites or unintuitive user interfaces to potentially receive useful tracking data. Unfortunately, this data is normally out-of-date, siloed to individual service providers, and generally lacks actionable information a consumer may use to understand how/why a shipment may be delayed, how to remedy the delay, and/or how to contact a service provider regarding the delay. As a result, this independent analysis performed by consumers is very commonly flawed by failing to account for every relevant aspect of the shipment logistics. Consequently, conventional shipping logistics technologies suffer from numerous issues that minimize the capabilities of consumers to adequately track shipments, produce out-of-date and isolated data, and create an unsavory user experience.

Thus, there is a need for technologies for retrieving and analyzing shipping data and rendering interfaces associated therewith that enables a system to provide a user with reliable, relevant, and actionable shipping logistics data in an efficient, consistent, and real-time manner.

SUMMARY

As previously mentioned, conventional shipping logistics technologies suffer from a general lack of relevant and actionable data, such that users are often forced to perform their own independent analysis regarding shipping delays, re-routes, and/or other circumstances which cause the user's shipment to arrive in a manner that was not originally anticipated. Many of these issues are the result of conventional service providers forcing users to manually retrieve data entity information from each service provider's website or other service portal, and as result, users are personally responsible for collating and interpreting disjointed sets of data. As referenced herein, such data entity information may be or include shipment data entities, order data entities, container data entities, inventory data entities, asset data entities, location data entities, and/or people data entities.

For example, a first conventional service provider may provide shipping data corresponding to a user's shipment through a unique tracking number the user may enter into the first conventional service provider's website. The data obtained from the first conventional service provider's website may correspond to a first portion of the user's shipment, such that the user must visit a second conventional service provider's website, web service, or other resource to retrieve data corresponding to a second portion of the user's shipment. Accordingly, and depending on the number of service providers involved in completing the user's shipment, the user may have to visit and retrieve data from a large number of different service provider resources in order to determine how and when the user's shipment may reach the intended destination.

Of course, this conventional configuration suffers from numerous drawbacks. For example, the data obtained by the user is commonly not real-time data, such that the data is out-of-date and/or otherwise provides an inaccurate picture of the current status of the user's shipment. Further, the data is siloed to individual service providers, such that the user is responsible for locating and aggregating any/all relevant data associated with the user's shipment. Additionally, this data generally lacks actionable information that may help a user understand how/why a shipment may be delayed, how to remedy the delay, and/or how to contact a service provider regarding the delay. As a result, this location and aggregation performed by users of conventional shipping logistics technologies yields flawed analysis and conclusions of the data, as the users fail to account for every relevant aspect of the shipment logistics. Thus, in general, conventional shipping logistics technologies are incapable of providing relevant, actionable data for users.

Therefore, it is an objective of the present disclosure to eliminate these and other problems with conventional shipping logistics technologies by introducing a workspace graphical user interface (GUI), a corresponding workspace application, and a set of application programming interfaces (APIs) that enable users to receive relevant, actionable data corresponding to shipments and other entities; and as a result, provide users with a holistic representation of their shipment's progress. In particular, the workspace GUI, the workspace application, and the set of APIs of the present disclosure alleviate the issues present with conventional technologies by enabling a central logistics server to retrieve and aggregate data entity information from a plurality of disparate service provider devices, and to analyze and display the data entity information in a centralized location that provides a user with easily identifiable, actionable information and estimations corresponding to the user's shipment based on the totality of data entity information associated with the shipment. Such a centralized analysis and display of data entity information allows the systems of the present disclosure to intelligently determine and/or estimate the impacts of any delays/re-routings on related shipments, and/or to make recommendations/suggestions regarding next steps for a user to mitigate issues corresponding to such delays/re-routings. Accordingly, the present techniques also enable a user to make informed decisions regarding contacting service providers, update others who are interested in the shipment, and/or otherwise remain up-to-date on the progress of the user's shipment based on real-time data aggregated from each service provider responsible for at least a portion of the shipment along a transportation route.

In accordance with the above, and with the disclosure herein, the present disclosure includes improvements in computer functionality or in improvements to other technologies at least because the present disclosure describes that, e.g., shipping logistics systems, and their related various components, may be improved or enhanced with the disclosed workspace GUI, the workspace application, and the set of APIs that provide more centralized, relevant, and actionable data entity information for respective users. That is, the present disclosure describes improvements in the functioning of a shipping logistics system itself or "any other technology or technical field" (e.g., the field of shipping/data logistics) because the disclosed workspace GUI, the workspace application, and the set of APIs improve and enhance operation of shipping logistics systems by introducing improved data entity information display flexibility/accuracy along with reduced data entity information aggregation data times to eliminate numerous inefficiencies and data entity information irrelevancies typically experienced by shipping logistics systems lacking such a workspace GUI, workspace application, and set of APIs. This improves over the prior art at least because such previous shipping logistics systems were inaccurate, inefficient, and provided irrelevant information as they lack the ability to flexibly, dynamically, and efficiently aggregate data entity information in a manner that allows for efficient retrieval, interpretation, and display of data entity information.

In particular, the workspace GUI, the workspace application, and the set of APIs improve data entity information aggregation flexibility, accuracy, and efficiency by actively retrieving data entity information from multiple disjointed service provider devices. This data entity information is aggregated by utilizing the set of APIs, and as a result, the data entity information is retrieved in substantially real-time from each shipping service provider device. Moreover, the workspace GUI, the workspace application, and the set of APIs of the present disclosure reduce data entity information aggregation times as compared to conventional techniques by automatically interfacing and extracting relevant data entity information from multiple, disjointed service provider devices. The workspace application then facilitates partitioning the data entity information into multiple workspace cards that are then rendered in the workspace GUI for access/viewing by a user of the user computing device, thereby providing a vastly improved user experience over conventional techniques that do not allow for such a unified view of data entity information corresponding to a user's shipment(s). Consequently, the workspace GUI, the workspace application, and the set of APIs of the present disclosure improve the overall data entity aggregation performance and user experience when compared with conventional techniques by eliminating irrelevant data entities, providing the most up-to-date data entities, displaying the aggregated data entities in an easily interpretable, actionable, and readily identifiable manner, and/or otherwise improving over the issues associated with conventional techniques.

In addition, the present disclosure includes applying various features and functionality, as described herein, with, or by use of, a particular machine, e.g., a central logistics server, a user computing device, a service provider device, and/or other hardware components as described herein.

Moreover, the present disclosure includes specific features other than what is well-understood, routine, conventional activity in the field, or adding unconventional steps that demonstrate, in various embodiments, particular useful applications, e.g., aggregating, by the one or more processors utilizing one or more application programming interfaces (APIs) from a set of APIs, a set of data entity information from one or more shipping service provider devices, the set of data entity information corresponding to the reference key and including real-time data from each shipping service provider participating in logistics or transportation of an object included in the set of data entity information along a transportation route; partitioning, by the one or more processors executing a workspace application, the set of data entity information into multiple workspace cards, each workspace card providing a different portion of the set of data entity information; and causing, by the one or more processors, the user computing device to render a workspace graphical user interface (GUI) that includes at least one workspace card of the multiple workspace cards for access by a user of the user computing device in the workspace application.

In an embodiment, the present invention is a method for retrieving and analyzing shipping data and rendering interfaces associated therewith. The method may include: receiving, at one or more processors, an indication of a reference key from a user computing device; aggregating, by the one or more processors utilizing one or more application programming interfaces (APIs), a set of data entity information from one or more shipping service provider devices, the set of data entity information corresponding to the reference key and including real-time data from each shipping service provider participating in logistics or transportation of an object included in the set of data entity information along a transportation route; partitioning, by the one or more processors, the set of data entity information into multiple workspace cards, each workspace card providing a different portion of the set of data entity information; and causing, by the one or more processors, the user computing device to render a workspace graphical user interface (GUI) that includes at least one workspace card of the multiple workspace cards for access by a user of the user computing device.

In a variation of this embodiment, the method further comprises: generating, by the one or more processors, a predicted value for one or more entries included in the at least one workspace card; and causing, by the one or more processors, the user computing device to render a predicted value graphical indication within the at least one workspace card of the workspace GUI.

In another variation of this embodiment, the method further comprises: determining, by the one or more processors, that a first entry in the set of data entity information indicates a delay has taken place along the transportation route; generating, by the one or more processors, a graphical indication of the delay for display in a map card of the multiple workspace cards; and causing, by the one or more processors, the user computing device to render at least the map card of the multiple workspace cards as part of the workspace GUI. Further in this variation, the method further comprises: analyzing, by the one or more processors, the first entry to determine a source of the delay; responsive to determining the source of the delay, determining, by the one or more processors, a first shipping service provider participating in the logistics or the transportation of the object that is responsible for the source of the delay; retrieving, by the one or more processors, contact information corresponding to the first shipping service provider; and causing, by the one or more processors, the user computing device to render the contact information as part of the workspace GUI, wherein a user interacting with the contact information causes the user computing device to initiate contact between the user computing device and a first shipping service provider device of the first shipping service provider.

In yet another variation of this embodiment, the set of data entity information includes at least one of: (i) an order data entity, (ii) a container data entity, (iii) an inventory data entity, (iv) an asset data entity, (v) a location data entity, or (vi) a people data entity; and the workspace cards of the workspace GUI include at least one of (i) an overview card, (ii) a route card, (iii) a map card, (iv) an activity feed card, (v) an order health information card, (vi) a nested shipments card, (vii) an inventory onboard card, or (viii) a route plan card.

In still another variation of this embodiment, the set of data entity information is a first set of data entity information, and the method further comprises: receiving, at the one or more processors, a user interaction indicating a selection of a combination function, the selection indicating a second set of data entity information; combining, by the one or more processors in response to the selection of the combination function, workspace cards associated with at least the first set of data entity information and the second set of data entity information into a combined workspace GUI; and causing, by the one or more processors, the user computing device to render the combined workspace GUI. Further in this variation, the combined workspace GUI includes at least (i) an overview card corresponding to both of the first set of data entity information and the second set of data entity information, and one or both of (ii) a map card corresponding to one or both of the first set of data entity information and the second set of data entity information or (iii) a route card corresponding to one or both of the first set of data entity information and the second set of data entity information.

In another embodiment, the present invention is a system for retrieving and analyzing shipping data and rendering interfaces associated therewith. The system may comprise: one or more processors; and one or more memories communicatively coupled with the user interface and the one or more processors, the one or more memories storing computer executable instructions thereon that, when executed by the one or more processors, cause the one or more processors to: receive an indication of a reference key from a user computing device, aggregate, by utilizing one or more application programming interfaces (APIs), a set of data entity information from one or more shipping service provider devices, the set of data entity information corresponding to the reference key and including real-time data from each shipping service provider participating in logistics or transportation of an object included in the set of data entity information along a transportation route, partition the set of data entity information into multiple workspace cards, each workspace card providing a different portion of the set of data entity information, and cause the user computing device to render a workspace graphical user interface (GUI) that includes at least one workspace card of the multiple workspace cards for access by a user of the user computing device.

In yet another embodiment, the present invention is a tangible machine-readable medium comprising instructions that, when executed, may cause a machine to at least: receive an indication of a reference key from a user computing device; aggregate, by utilizing one or more application programming interfaces (APIs), a set of data entity information from one or more shipping service provider devices, the set of data entity information corresponding to the reference key and including real-time data from each shipping service provider participating in logistics or transportation of an object included in the set of data entity information along a transportation route; partition the set of data entity information into multiple workspace cards, each workspace card providing a different portion of the set of data entity information; and cause the user computing device to render a workspace graphical user interface (GUI) that includes at least one workspace card of the multiple workspace cards for access by a user of the user computing device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 3A-3F depict various example graphical user interfaces (GUIs) utilized to display sets of data entity information, in accordance with embodiments described herein.

Figure 1:
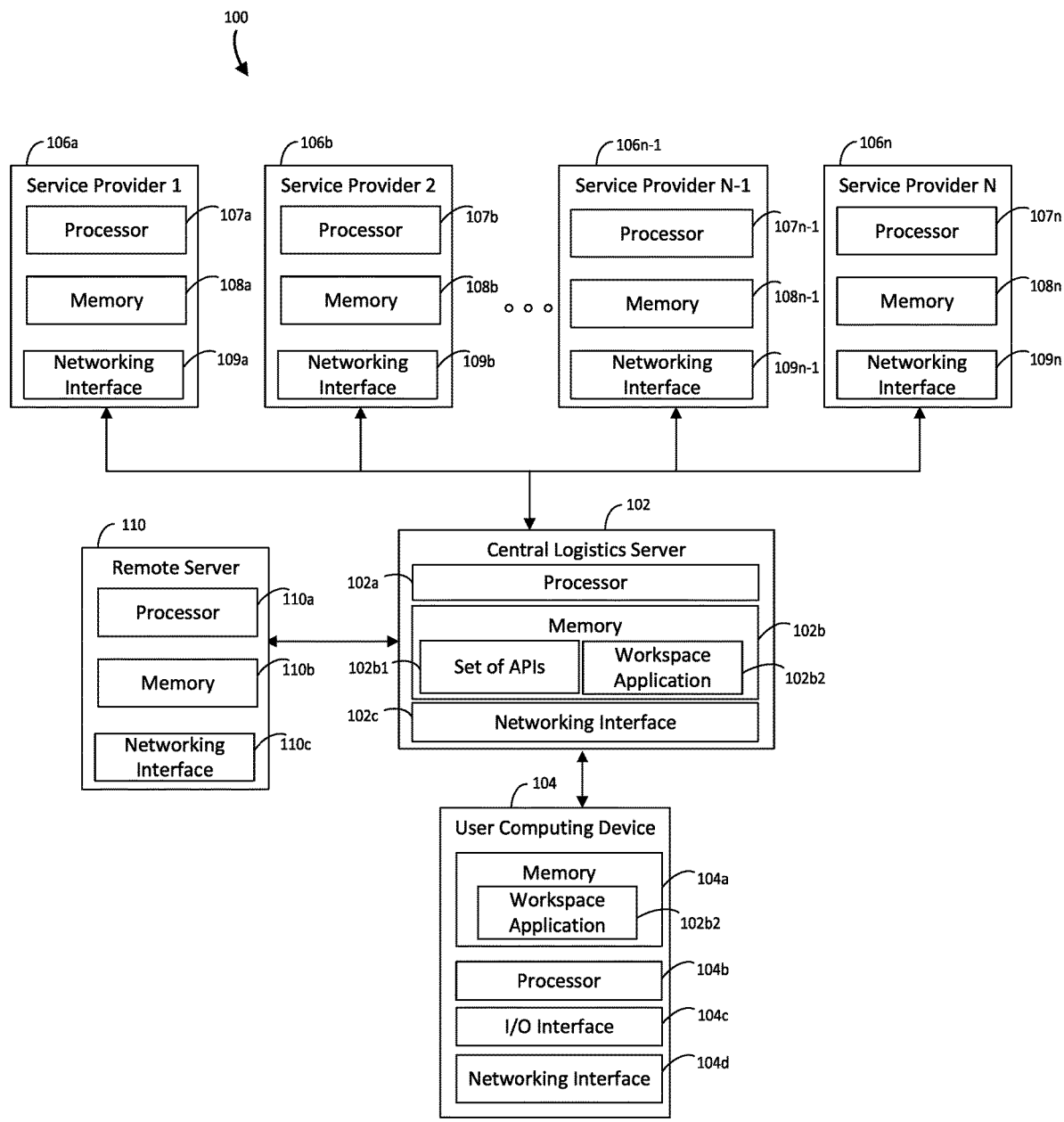
FIG. 1 depicts an example environment in which systems/devices for retrieving and analyzing shipping data and rendering interfaces associated therewith may be implemented, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 depicts an example environment 100 in which systems/devices for retrieving and analyzing shipping data and rendering interfaces associated therewith may be implemented, in accordance with embodiments described herein. In the example embodiment of FIG. 1, the example environment 100 includes a central logistics server 102 that is communicatively coupled to a user computing device 104, a set of service provider devices 106*a-n*, and a remote server 110. Generally speaking, the central logistics server 102, the user computing device 104, the set of service provider devices 106*a-n*, and/or the remote server 110 may be capable of executing instructions to, for example, implement operations of the example methods described herein, as may be represented by the flowcharts of the drawings that accompany this description. Namely, the central logistics server 102 may be connected to the user computing device 104, the set of service provider devices 106a-n, and/or the remote server 110 across multiple communication channels, and may generally be configured to receive and process information received from the user computing device 104, the set of service provider devices 106a-n, and/or the remote server 110.

Generally speaking, the central logistics server 102 may be configured to transmit and receive data entity information in order to enable a user to determine updates and analyze estimations and potential contact options for shipments represented by the data entity information. More specifically, the central logistics server 102 may be configured to receive an indication of a reference key from a user (e.g., via user computing device 104), aggregate data entity information associated with various service providers (e.g., via service provider devices 106a-n), and partition the data entity information into multiple workspace cards (e.g., for display on the workspace GUI as part of the workspace application). Thereafter, the central logistics server 102 may be configured to transmit the partitioned data entity information to the user computing device 104 and render the information on a user interface (e.g., via I/O interface 104c) of the device 104 on a workspace GUI as part of the workspace application 102b2 in order to enable the user to view/analyze the partitioned data entity information.

The central logistics server 102 may also include a set of APIs 102b1 that enable the central logistics server 102 to interface and communicate with each of the service provider devices 106a-n. More specifically, each of the service provider devices 106a-n may include a separate API (e.g., in the respective memories 108a-n) that are configured to communicate with other applications/devices that include the respective API. Thus, the set of APIs 102b1 stored in memory 102b of the central logistics server 102 may enable the central logistics server 102 to communicate and extract data entity information from each of the service provider devices 106a-n without any issues.

Further, the central logistics server 102 may include a workspace application 102b2 that includes executable instructions that, when executed, may cause the central logistics server 102 to perform one or more of the actions described herein in reference to the methods of the present disclosure. More specifically, the workspace application 102b2 may instruct the processor 102a to receive an indication of a reference key from a user computing device 104; aggregate, by utilizing the set of APIs 102b1, a set of data entity information from one or more shipping service provider devices 106a-n; partition the set of data entity information into multiple workspace cards; and cause the user computing device 104 to render a workspace GUI via the workspace application 102b2 that includes at least one workspace card of the multiple workspace cards for access by a user of the user computing device in the workspace application 102b2.

The user computing device 104 may be any suitable device that a user may use, for example, to execute an application and/or otherwise communicate with the central logistics server 102. In particular, the user computing device 104 may be or include a mobile phone (e.g., a smartphone), a laptop, a tablet, a smartwatch, smart glasses, and/or any other suitable computing device or combinations thereof that is capable of communicating with the central logistics server 102. The user computing device 104 includes a memory 104a, one or more processors 104b, an input/output (I/O) interface 104c, and a networking interface 104d. The memory 104a may include an application (not shown), which may generally include executable instructions, that when executed by the one or more processors 104b, cause the user computing device 104 to perform various actions that enable a user of the user computing device 104 to receive data entity information from the central logistics server 102 corresponding to a data entity referenced by the user through reference key(s) input at the I/O interface 104c.

The I/O interface 104c may include or implement operator interfaces configured to present information to an administrator, user, or operator and/or receive inputs from the administrator, user, or operator. An operator interface may provide a display screen (e.g., via the user computing device 104) which a user/operator may use to visualize any images, graphics, text, data, features, pixels, and/or other suitable visualizations or information. For example, the user computing device 104 may comprise, implement, have access to, render, or otherwise expose, at least in part, a graphical user interface (GUI) for displaying images, graphics, text, data, features, pixels, and/or other suitable visualizations or information on the display screen. The I/O interface 104c may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 104. According to some embodiments, an administrator or user/operator may access the user computing device 104 to input reference key(s) and/or indications of reference keys for determination of data entity information, review data entity information, make changes, input responses and/or selections, and/or perform other functions.

The set of service provider devices 106a-n may generally receive and store data entity information associated with data entities (e.g., shipment data entities, order data entities, container data entities, inventory data entities, asset data entities, location data entities, and/or people data entities) delivered along a transportation route. Moreover, each service provider device 106a-n may correspond to a particular service provider, such that the data entity information received/stored at each device 106a-n may correspond to the specific service provider administering the device 106a-n. Each of the set of service provider devices 106a-n may include a processor 107a-n, a memory 108a-n, and a networking interface 109a-n.

For example, a first service provider may own and/or otherwise administer the service provider 1 device 106a, a second service provider may own and/or otherwise administer the service provider 2 device 106b, a third service provider may own and/or otherwise administer the service provider N-1 device 106n-1, and a fourth service provider may own and/or otherwise administer the service provider N device 106n. Consequently, the service provider 1 device 106a may receive and store data entity information associated with air shipments between various origins/destinations that were performed by the first service provider, the service provider 2 device 106b may receive and store data entity information associated with ground shipments between various origins/destinations that were performed by the second service provider, the service provider N-1 device 106n-1 may receive and store data entity information associated with trans-oceanic shipments between various origins/destinations that were performed by the third service provider, and the service provider N device 106n may receive and store data entity information associated with inventory management or human transportation logistics conducted under the supervision of the fourth service provider. Of course, the central logistics server 102 may be communicatively connected to any suitable number of service provider devices 106*a-n*, such that Nin may be any suitable number.

The remote server 110 may generally be communicatively connected to the central logistics server 102, and may receive and/or transmit data from/to the central logistics server 102. The remote server 110 may also include a processor 110*a*, a memory 110*b*, and a networking interface 110*c*. For example, the central logistics server 102 may receive data entity information from the remote server 110, and may store the data entity information in memory 102*b*. As another example, the central logistics server 102 may transmit data entity information retrieved/accessed from the set of service provider devices 106*a-n* to the remote server 110 for storage in the memory 110*b*. The remote server 110 may also be configured to execute instructions (via the processor 110*a*) to, for example, implement operations of the example methods described herein, as may be represented by the flowcharts of the drawings that accompany this description.

More generally, each of the one or more memories 102*b*, 104*a*, 108*a-n*, 110*b* may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., set of APIs 102*b*1, workspace application 102*b*2, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 102*a*, 104*b*, 108*a-n*, 110*a* (e.g., working in connection with a respective operating system in the one or more memories 102*b*, 104*a*, 108*a-n*, 110*b*) to facilitate, implement, or perform the machine readable instructions, methods, processes, elements or limitations, as illustrated, depicted, or described for the various flowcharts, illustrations, diagrams, figures, and/or other disclosure herein.

The memories 102*b*, 104*a*, 108*a-n*, 110*b* may also store an operating system (OS) (e.g., Microsoft Windows, Linux, Unix, etc.) capable of facilitating the functionalities, apps, methods, or other software as discussed herein. Additionally, or alternatively, an application stored in memory 102*b*, 104*a*, 108*a-n*, 110*b* may also be stored in an external database (e.g., remote server 110), which is accessible or otherwise communicatively coupled to the central logistics server 102, the user computing device 104, and/or the set of service provider devices 106*a-n*. For example, at least some of the applications, software components, or APIs may be, include, otherwise be part of, a particular application, where each may be configured to facilitate their various functionalities discussed herein. It should be appreciated that one or more other applications may be envisioned and that are executed by the one or more processors 102*a*, 104*b*, 108*a-n*, 110*a*.

In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.). Moreover, the one or more memories 102*b*, 104*a*, 108*a-n*, 110*b* may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein.

The one or more processors 102*a*, 104*b*, 108*a-n*, 110*a* may be connected to the one or more memories 102*b*, 104*a*, 108*a-n*, 110*b* via a computer bus responsible for transmitting electronic data, data packets, or otherwise electronic signals to and from the one or more processors 102*a*, 104*b*, 108*a-n*, 110*a* and one or more memories 102*b*, 104*a*, 108*a-n*, 110*b* in order to implement or perform the machine readable instructions, methods, processes, elements or limitations, as illustrated, depicted, or described for the various flowcharts, illustrations, diagrams, figures, and/or other disclosure herein.

The one or more processors 102*a*, 104*b*, 108*a-n*, 110*a* may interface with the one or more memories 102*b*, 104*a*, 108*a-n*, 110*b* via the computer bus to execute any suitable application (e.g., workspace application 102*b*2), algorithm, and/or executable instructions (e.g., set of APIs 102*b*1) necessary to perform any of the actions associated with the methods of the present disclosure. The one or more processors 102*a*, 104*b*, 108*a-n*, 110*a* may also interface with the one or more memories 102*b*, 104*a*, 108*a-n*, 110*b* via the computer bus to create, read, update, delete, or otherwise access or interact with the data stored in the one or more memories 102*b*, 104*a*, 108*a-n*, 110*b* and/or external databases (e.g., a relational database, such as Oracle, DB2, MySQL, or a NoSQL based database, such as MongoDB). The data stored in the one or more memories 102*b*, 104*a*, 108*a-n*, 110*b* and/or an external database may include all or part of any of the data or information described herein, including, for example, data entity information, reference keys, shipping metrics, origin data, destination data, origin/destination tile data, and/or other suitable information or combinations thereof.

The networking interfaces 102*c*, 104*d*, 109*a-n*, 110*c* may be configured to communicate (e.g., send and receive) data via one or more external/network port(s) to one or more networks or local terminals, as described herein. In some embodiments, the networking interfaces 102*c*, 104*d*, 109*a-n*, 110*c* may include a client-server platform technology such as ASP.NET, Java J2EE, Ruby on Rails, Node.js, a web service or online API, responsive for receiving and responding to electronic requests. The networking interfaces 102*c*, 104*d*, 109*a-n*, 110*c* may implement the client-server platform technology that may interact, via the computer bus, with the one or more memories 102*b*, 104*a*, 108*a-n*, 110*b* (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 102*c*, 104*d*, 109*a-n*, 110*c* may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a network. In some embodiments, the network (not shown) may comprise a private network or local area network (LAN). Additionally, or alternatively, the network may comprise a public network such as the Internet. In some embodiments, the network may comprise routers, wireless switches, or other such wireless connection points communicating to central logistics server 102 (via the networking interface 102c), the user computing device 104 (via networking interface 104d), the set of service provider devices 106a-n (via the networking interfaces 109a-n), and/or the remote server 110 (via networking interface 110c) via wireless communications based on any one or more of various wireless standards, including by non-limiting example, the BLUETOOTH standard (e.g., BLE), IEEE 802.11a/b/c/g (WIFI), or the like.

Figure 2:
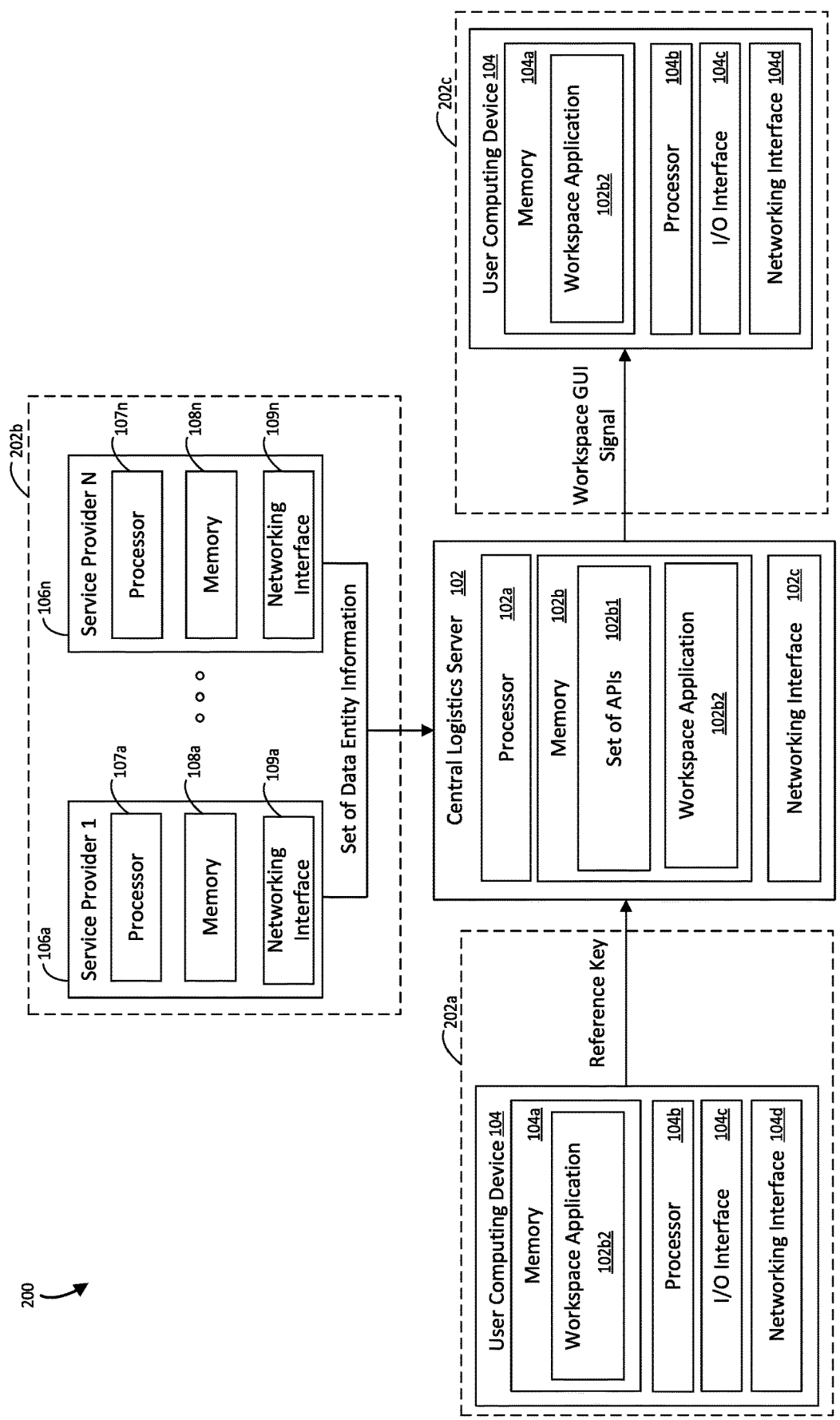
FIG. 2 depicts a central logistics server performing actions at several time instances in accordance with instructions executed as part of a method for retrieving and analyzing shipping data and rendering interfaces associated therewith, and in accordance with embodiments described herein.

FIG. 2 depicts a central logistics server 102 performing actions at several time instances 202a-c in accordance with instructions executed as part of a method for retrieving and analyzing shipping data and rendering interfaces associated therewith, and in accordance with embodiments described herein. Generally speaking, the central logistics server 102 may receive inputs (e.g., an indication of a reference key) from the user computing device 104 at a first time instance 202a, the server 102 may receive a set of data entity information from a set of service provider devices 106a-n via the set of APIs 102b1 at a second time instance 202b, and the server 102 may execute the workspace application 102b2 in order to output the workspace GUI signal to cause the user computing device 104 to render the workspace GUI at a third time instance 202c.

Thus, in general, the actions illustrated in FIG. 2 demonstrate the central logistics server 102 operating the workspace application 102b2 as a software as a service (SaaS) application. In particular, the central logistics server 102 receives inputs (e.g., a reference key indication and/or a reference key) from the user, interacts with the service provider devices 106a-n, processes the data entity information received from the devices 106a-n, and enables the user computing device 104 to read and/or otherwise receive the data entity information from the central logistics server 102.

More specifically, at the first time instance 202a, the central logistics server 102 may receive an indication of a reference key (e.g., selection of a particular shipment/order corresponding to a reference key) from an electronic device associated with a user (e.g., user computing device 104). A user may desire to search for data entity information corresponding to one or more shipments, for example, and may utilize the I/O interface 104c to input the reference key or the indication of the reference key for transmission to the central logistics server 102. The indication and/or reference key input by the user may be and/or include a shipment tracking number, an order number, a shipping container number, and/or any other suitable data entity identifier or combinations thereof.

In certain aspects, the user computing device 104 and/or the central logistics server 102 (e.g., via the workspace application 102b2) may automatically retrieve additional or associated information corresponding to a reference key input by user, based on the specificity of the reference key and/or the indication of the reference key input by the user. For example, a user may input a reference key or select an indication of the reference key (e.g., in the workspace application 102b2) for a particular order that is currently being transported within a large container that includes multiple other orders associated with the user. In this example, the server 102 may automatically retrieve the data entity information associated with the additional orders within the large container that includes the order corresponding to the reference key and/or indication input by the user.

In any event, based on the reference key and/or indication of a reference key received from the user computing device 104, the central logistics server 102 may proceed to retrieve (e.g., by the one or more processors 102a executing the set of APIs 102b1) shipping information from the set of service provider devices 106a-n at the second time instance 202b. In particular, the workspace application 102b2 may instruct the processor(s) 102a to utilize the set of APIs 102b1 to aggregate data entity information corresponding to shipments delivered along a transportation route in response to a user inputting a reference key and/or an indication of a reference key. As such, the second time instance 202b may represent the central logistics server 102 retrieving a set of data entity information from the set of service provider devices 106a-n, in accordance with instructions included in the workspace application 102b2.

Each service provider device 106a-n may transmit the data entity information corresponding to the user's input reference key and/or indication to the central logistics server 102, where the workspace application 102b2 may instruct the processors 102a to store the data entity information in memory 102b. The workspace application 102b2 may then reference the data entity information when the workspace application 102b2 partitions the data entity information into multiple workspace cards. In particular, the workspace application 102b2 may proceed to instruct the processors 102a to analyze the data entity information received from the service provider devices 106a-n at the second time instance 202b and determine relevant partitions for the data entity information. For example, data entity information corresponding to a route plan of a shipment may be partitioned into a route plan card, data entity information corresponding to a map showing location data of the shipment may be partitioned into a map card, and data entity information corresponding to inventory on-board the transportation vehicle currently transporting the shipment along the transportation route may be partitioned into an inventory onboard card. Each of these workspace cards may be included in the resulting workspace GUI rendered as part of the workspace application 102b2.

When the workspace application 102b2 has instructed the processors 102a to aggregate the set of data entity information at the second time instance 202b, the workspace application 102b2 may proceed at the third time instance 202c to instruct the processors 102a to generate and transmit a workspace GUI signal to the user computing device 104 for rendering of the data entity information to be viewed by a user. Generally, the workspace application 102b2 may instruct the processors 102a to generate the workspace GUI signal by analyzing the partitioned data entity information and preparing the partitioned data entity information for transmission to the user computing device 104. For example, the workspace application 102b2 may instruct the processors 102a to transmit all partitioned data entity information in a single signal to the user computing device 104 or the workspace application 102b2 may instruct the processors 102a to transmit the partitioned data entity information to the user computing device 104 in a series of signals that may preserve transmission bandwidth and/or otherwise reduce the size of the transmission from the central logistics server 102 to the user computing device 104.

Additionally, part of the generation of the workspace GUI signal may include the workspace application 102b2 instructing the processors 102a to calculate and/or otherwise generate estimations/predictions corresponding to the data entity information. For example, the workspace application 102b2 may cause the processors 102a to analyze the data entity information, and as a result, the processors 102a may determine that a shipment represented by the data entity information is delayed. Upon making the determination that the shipment is delayed, the workspace application 102b2 may cause the processors 102a to generate an estimated time of arrival based on the nature of the delay. If the delay is severe because an airport is closed due to poor weather conditions, then the workspace application 102b2 may cause the processors 102a to generate an estimated time of arrival that is relatively far in the future (e.g., more than one-day delay). However, if the delay is relatively minimal (e.g., bad traffic slowing a transportation truck), then the workspace application 102b2 may cause the processors 102a to generate an estimated time of arrival that is relatively soon (e.g., one to two-hour delay).

In any event, when the processors 102a have analyzed and partitioned the data entity information, the processors 102a may transmit the partitioned data entity information (along with any estimations/predictions) to the user computing device 104 for presentation to the user. The workspace application 102b2 may include instructions that cause the user computing device 104 to render the data entity information for display at the user computing device 104 (e.g., via I/O interface 104c). Such display may include a set of workspace cards that include the partitioned data entity information received from the service provider devices 106a-n (e.g., service provider 1-N), and may also include a set of predictions/estimations corresponding to the data entity information.

Figure 3A:
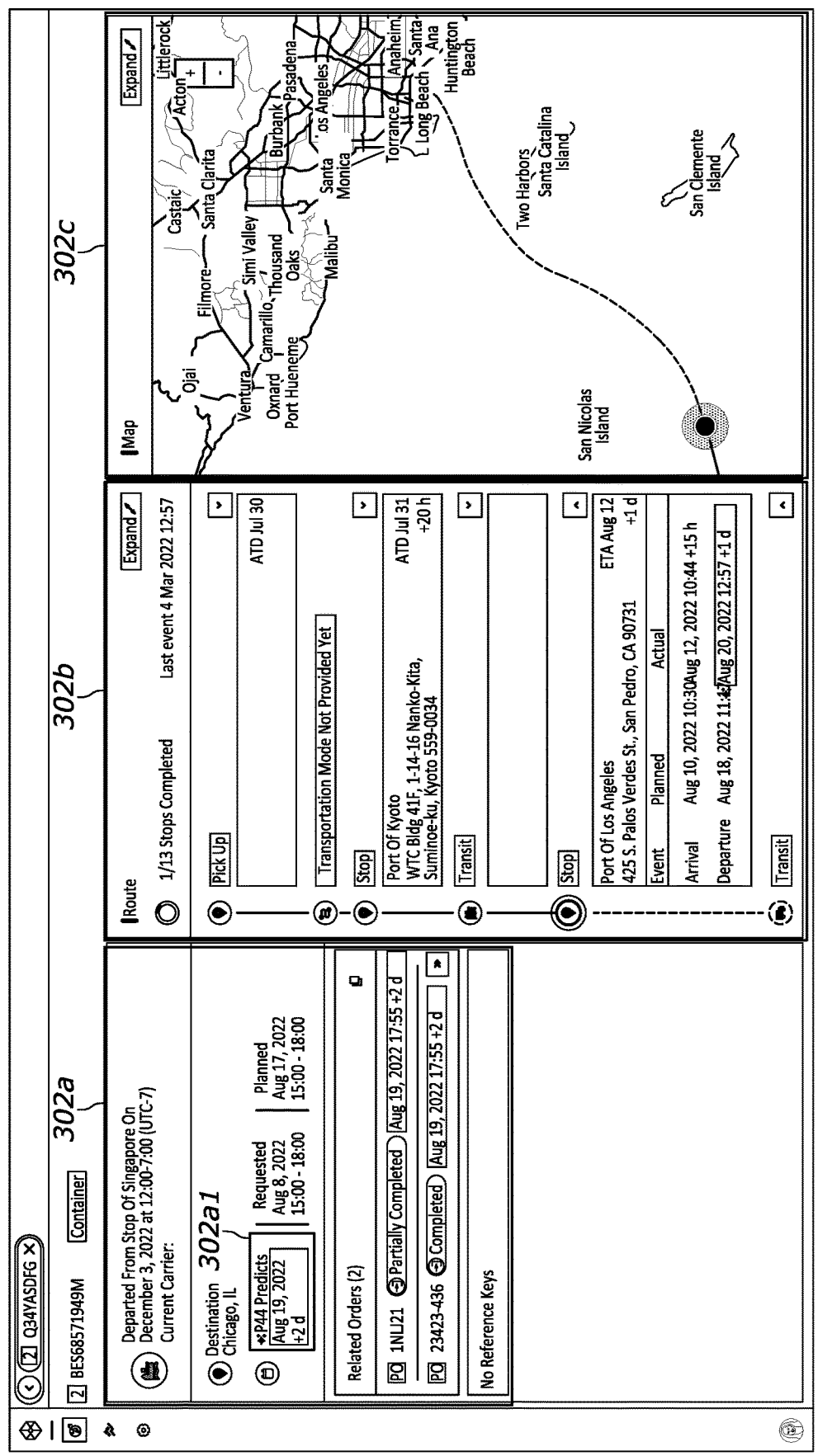

FIGS. 3A-3F depict various example graphical user interfaces (GUIs) utilized to display sets of data entity information, in accordance with embodiments described herein. In particular, FIG. 3A depicts a first workspace GUI 300 that includes multiple workspace cards 302a-c. The workspace cards 302a-c generally include the partitioned data entity information received from various service provider devices (e.g., service provider devices 106a-n) in response to a reference key indication received as an input from a user (e.g., via user computing device 104). More specifically, the first workspace GUI 300 includes an overview card 302a that generally includes data entity information providing a user with an overview of relevant details corresponding to the shipment or other data entity associated with the user's reference key. For example, the overview card 302a may include a destination of a shipment, a shipment origin location, an expected total shipment time, an expected arrival time, any related orders, and an estimated arrival time 302a1. The estimated arrival time 302a1 may have been estimated as a result of instructions included as part of the workspace application (e.g., workspace application 102b2).

The first workspace GUI 300 also includes a route card 302b and a map card 302c. Generally, the route card 302b and the map card 302c may represent transportation logistics of a particular shipment. The route card 302b may include location-by-location updates corresponding to the various travel nodes along the transportation route for a particular shipment. For example, the route card 302b may include timestamped data corresponding to a pickup of the shipment at a pickup location, a time of arrival of the shipment at a switch-off location between ground transportation and air transportation, and an expected time of arrival of the shipment at the destination. Correspondingly, the map card 302c may include real-time or substantially real-time location information of the shipment along a planned transportation route. As illustrated, a service provider may currently be transporting the shipment across a body of water (e.g., by air or by boat), such that the map card 302c shows the shipment on the body of water along the transportation route. Of course, the route card 302b and the map card 302c may include any suitable information corresponding to the transportation of the shipment along the transportation route.

Figure 3B:
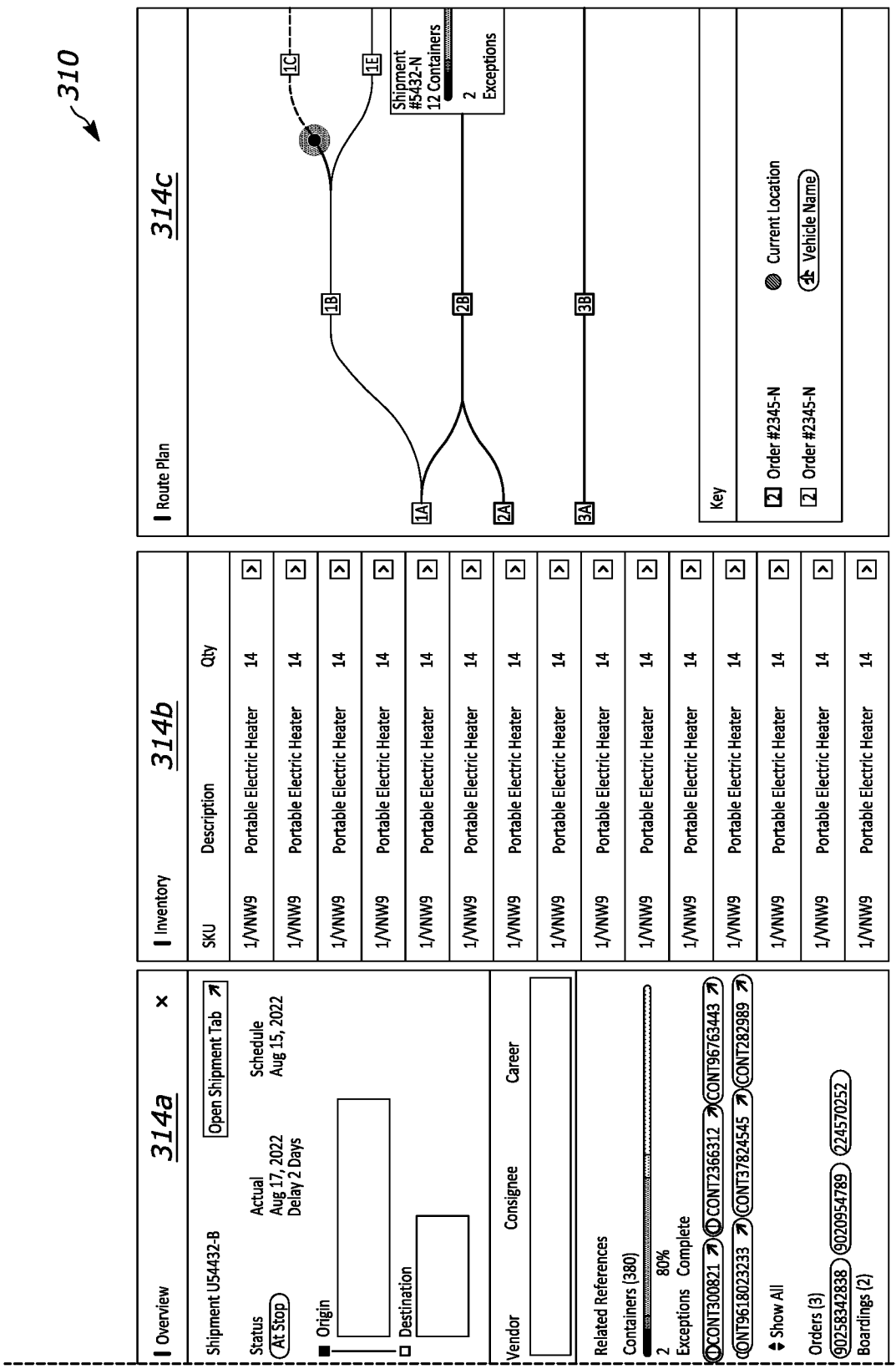

FIG. 3B depicts a second workspace GUI 310 that includes multiple workspace cards 312a-c and 314a-c corresponding to a set of order data entity information. The workspace cards 312a-c and 314a-c may include a variety of cards that may be presented to a user at any given time in response to inputting a reference key indication or reference key corresponding to the order. In particular, the workspace cards 312a-c include an overview card 312a, an activity feed card 312b, and a nested shipments card 312c. The overview card 312a generally includes order data entity information providing a user with an overview of relevant details corresponding to the order or other data entity associated with the user's reference key. The activity feed card 312b may include tasks, alerts, and/or other indications that may be relevant for a user to analyze relating to the order/shipment. For example, the activity feed card 312b may notify a user that the user has to complete an acknowledgement task related to the transportation of the order. The nested shipments card 312c may generally include multiple shipments associated with a user, and/or that are otherwise related to an order, such as shipments that are transported in a same container or on a same transportation vehicle.

The workspace cards 314a-c include an overview card 314a, an inventory card 314b, and a route plan card 314c. The overview card 314a generally includes order data entity information providing a user with an overview of relevant details corresponding to the order or other data entity associated with the user's reference key. The inventory card 314b may include particular items, SKUs, and/or other object references that may be included in the order/shipment. For example, the inventory card 314b may include a listing of multiple objects (e.g., portable electric heater, refrigeration units, etc.) that are included for transportation as part of a particular order/shipment. The route plan card 314c may generally include an illustration of the planned transportation route, over which, the order/shipment will be (or has been) transported by one or more service providers. The planned transportation route illustrated in the route plan card 314c may include planned transportation routes for one or more orders, shipments, and/or other objects, such that the planned transportation route may include one or more branching paths that represent the divergent paths, across which, different orders/shipments may be transported to their eventual destinations. In other instances, the branching paths of the planned transportation route may illustrate one or more alternative transportation routes for an order/shipment in the event of substantial delays or other events that may disrupt the planned transportation route.

Figure 3C:
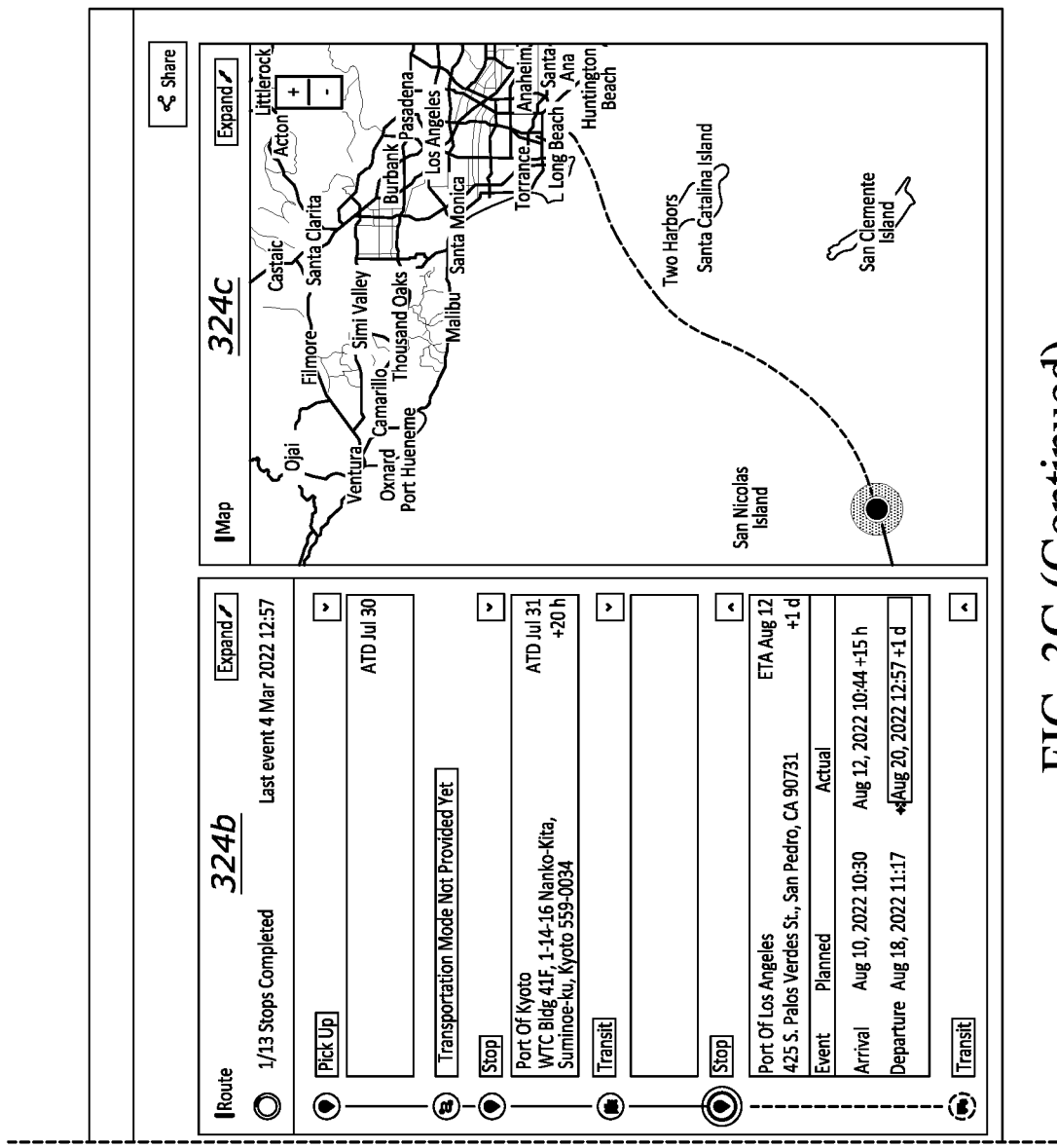
Figure 3D:
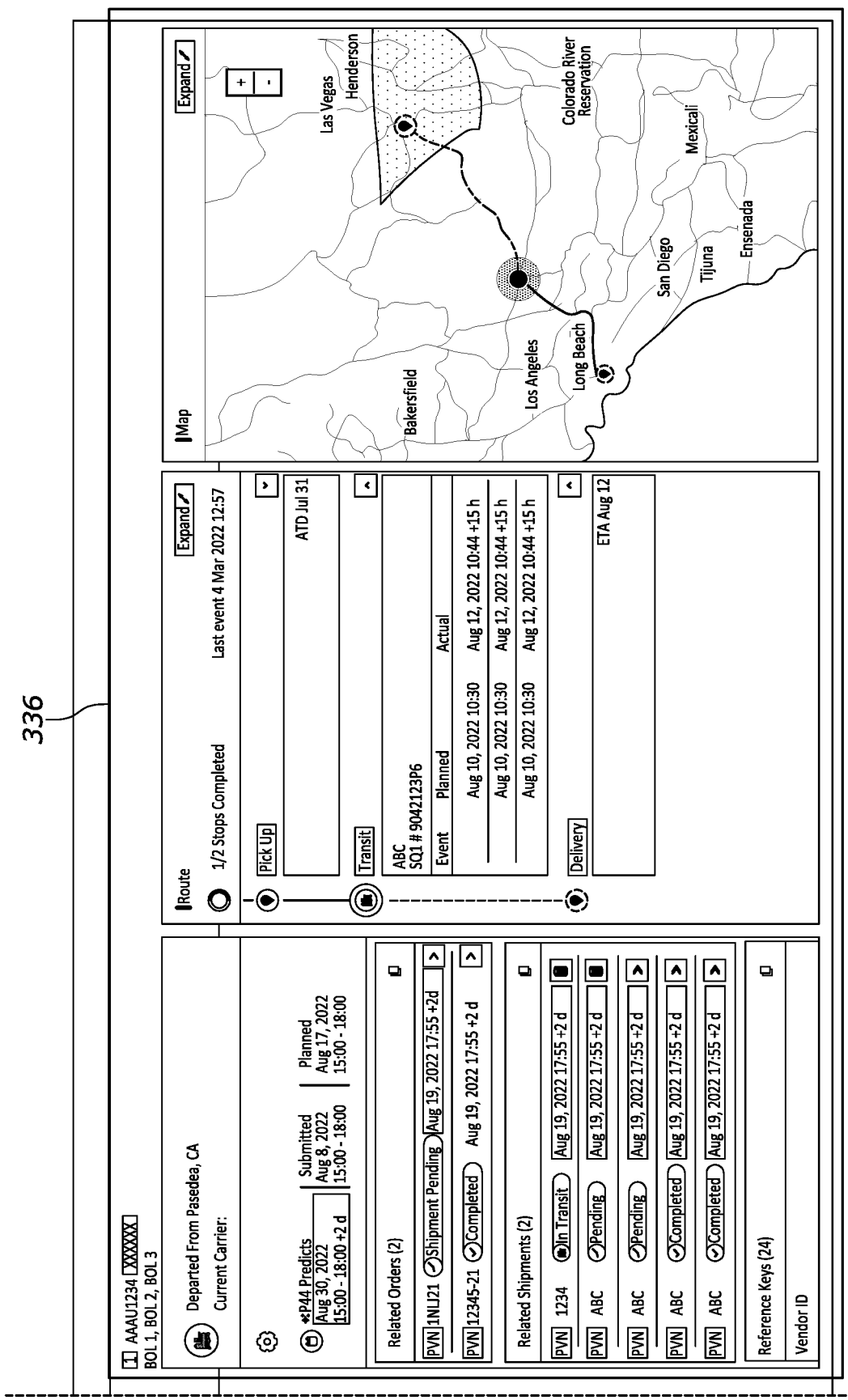

FIGS. 3C and 3D depict a third GUI 320 and a fourth GUI 330, respectively, that illustrate the capabilities of the workspace application to provide the user with multiple concurrent GUIs to analyze data entity information related to multiple, related shipments. In the third GUI 320, the overview card 322a and the nested shipments card 322b may correspond to a first data entity, and the overview card 324a, the route card 324b, and the map card 324c may correspond to a second data entity. Similarly, in the fourth GUI 330, the first set of workspace cards 332 may correspond to a first data entity, the second set of workspace cards 334 may correspond to a second data entity, and the third set of workspace cards 336 may correspond to a third data entity. Thus, a user with multiple shipments or related orders may utilize the GUIs of the workspace application (e.g., workspace application 102b2) to concurrently view the data entity information corresponding to each shipment/order. In this manner, the user may quickly and easily analyze up-to-date information corresponding to multiple orders, such that the workspace application alleviates the burden on users to individually retrieve and analyze data entity information for each order/shipment on a case-by-case basis, and thereby greatly improves the user experience and increases the efficiency of the overall process of order/shipment data entity information aggregation/analysis.

Figure 3E:
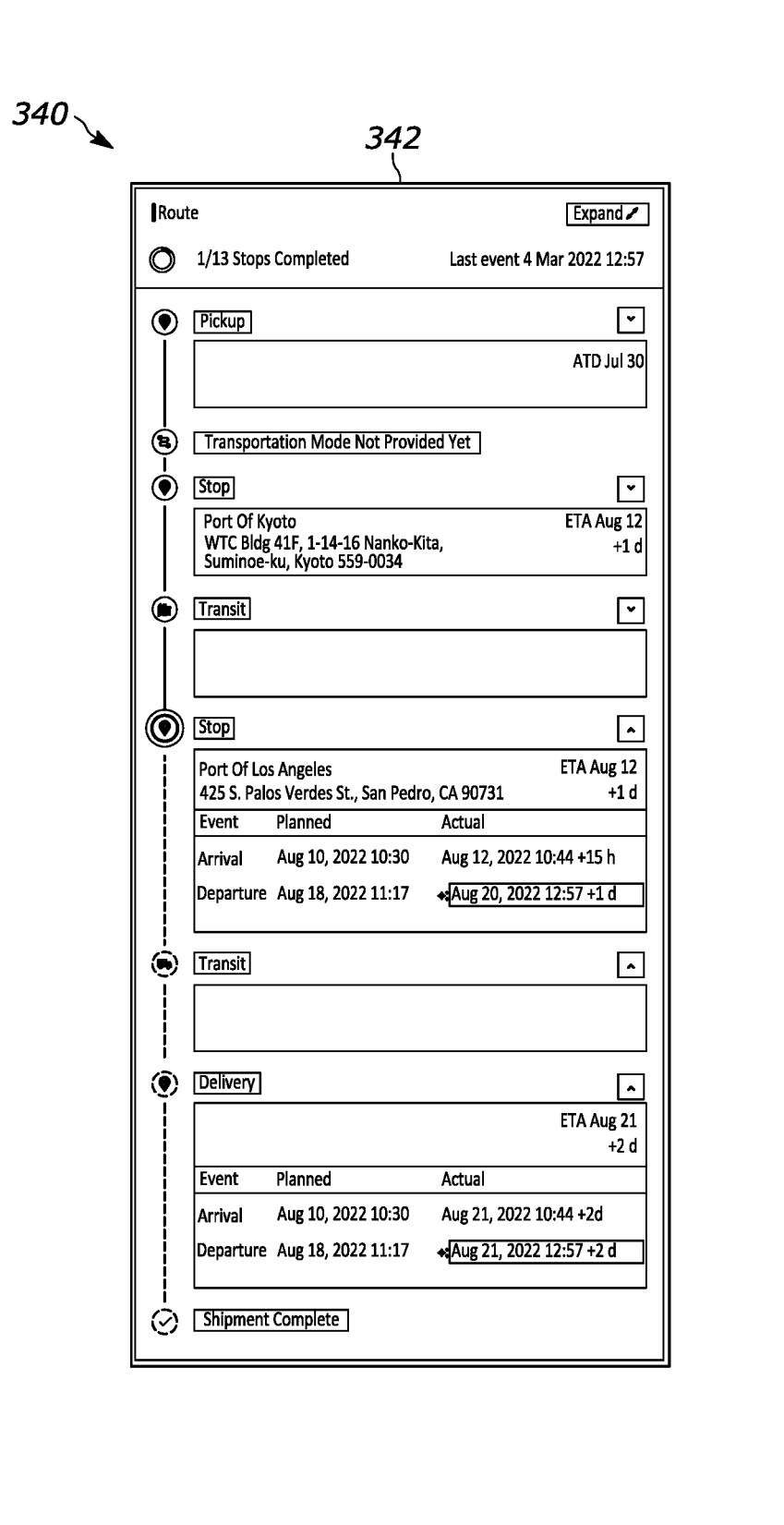

FIG. 3E depicts a fifth workspace GUI 340 that includes a collapsed route card 342 and an expanded route card 344. The collapsed route card 342 enables a user to receive select, relevant route information corresponding to the transportation route of the user's order/shipment. By contrast, the expanded route card 344 provides more data entity information than the collapsed route card 342, such that a user may receive more, relevant route information corresponding to the transportation route of the user's order/shipment. For example, the collapsed route card 342 includes each of the transportation route hubs/stops along the transportation route, whereas the expanded route card 344 additionally includes arrival and departure times for each of the transportation route hubs/stops along the transportation route where the order/shipment has previously arrived and/or departed. Regardless, the workspace application (e.g., workspace application 102b2) may cause the user computing device (e.g., user computing device 104) to render either the collapsed route card 342 or the expanded route card 344 as a result of transmitting the workspace GUI signal to the user computing device 104. Of course, both of the collapsed route card 342 and/or the expanded route card 344 may include estimations/predictions generated as a result of instructions included in the workspace application.

FIG. 3F depicts a sixth workspace GUI 350 that includes multiple workspace cards that each include card delay portions 352, 354, and 356. Generally, the instructions included as part of the workspace application (e.g., workspace application 102b2) may render delay portions (e.g., 352, 354, and 356) in any workspace card as a result of determining a shipment/order is delayed by any amount and/or in any way. For example, the first card delay portion 352 may be included as part of an overview card, and the first card delay portion 352 may generally include delay indications in multiple locations within the overview card, indicating to the user that the shipment/order is and/or is likely going to be delayed. The second card delay portion 354 may be included as part of an activity feed card, and may include specific action items or suggested actions for a user to alleviate potential issues/problems associated with the delay. The second card delay portion 354 may also include explanations and/or other insights related to the delay that may be included and/or determined from the set of data entity information. The third card delay portion 356 may be included as part of a route card, and the third card delay portion 356 may generally include estimated delay times as well as delay indications associated with specific portions of the transportation route.

Figure 4:
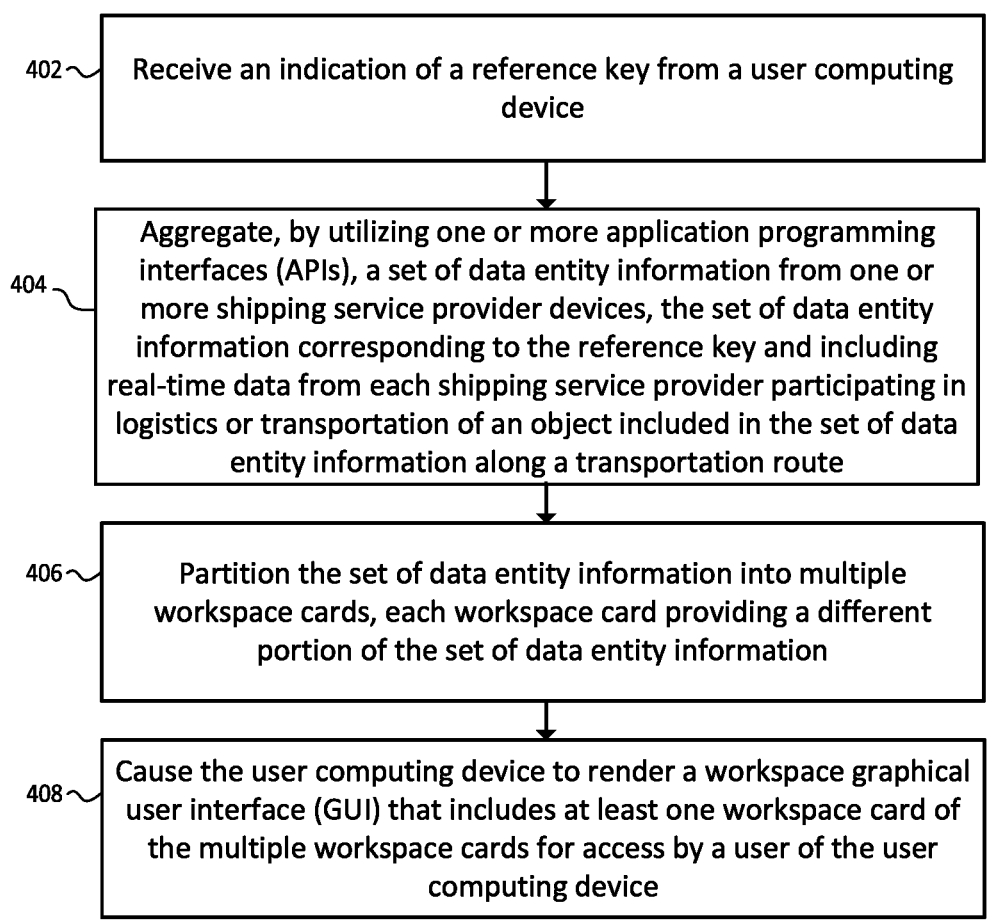
FIG. 4 is a flowchart representative of a method for retrieving and analyzing shipping data and rendering interfaces associated therewith, in accordance with embodiments described herein.

FIG. 4 is a flowchart representative of a method 400 for retrieving and analyzing shipping data and rendering interfaces associated therewith, in accordance with embodiments described herein. Generally, and as described herein, the method 400 for retrieving and analyzing shipping data and rendering interfaces associated therewith may cause the central logistics server 102 to receive a reference key indication or reference key from a user computing device, aggregate a set of data entity information from one or more shipping service provider devices, partition the set of data entity information into multiple workspace cards, and cause the user computing device to render a workspace graphical user interface (GUI) that includes at least one workspace card of the multiple workspace cards for access by a user of the user computing device in the workspace application. More specifically, the method 400 enables the central logistics server 102 to consistently and reliably provide relevant data entity information for users by utilizing a set of APIs and a workspace application configured to intelligently aggregate and partition the data entity information. It is to be understood that any of the steps of the method 400 may be performed by, for example, the central logistics server 102, and/or any other suitable components or combinations thereof discussed herein.

At block 402, the method 400 includes receiving, at one or more processors, an indication of a reference key from a user computing device (block 402). The method 400 further includes aggregating, by the one or more processors utilizing one or more application programming interfaces (APIs) from a set of APIs, a set of data entity information from one or more shipping service provider devices (block 404). The set of data entity information may correspond to the reference key and including real-time data from each shipping service provider participating in logistics or transportation of an object included in the set of data entity information along a transportation route.

The method 400 may further include partitioning, by the one or more processors executing a workspace application, the set of data entity information into multiple workspace cards (block 406). Each workspace card may provide a different portion of the set of data entity information. The method 400 further includes causing, by the one or more processors, the user computing device to render a workspace graphical user interface (GUI) that includes at least one workspace card of the multiple workspace cards for access by a user of the user computing device in the workspace application (block 408).

In certain aspects, the method 400 further includes generating, by the one or more processors, a predicted value for one or more entries included in the at least one workspace card. In these aspects, the method 400 further includes causing, by the one or more processors, the user computing device to render a predicted value graphical indication within the at least one workspace card of the workspace GUI.

In some aspects, the method 400 further includes determining, by the one or more processors, that a first entry in the set of data entity information indicates a delay has taken place along the transportation route. In these aspects, the method 400 further includes generating, by the one or more processors, a graphical indication of the delay for display in a map card of the multiple workspace cards, and causing, by the one or more processors, the user computing device to render at least the map card of the multiple workspace cards as part of the workspace GUI. Further in these aspects, the method 400 may further include analyzing, by the one or more processors, the first entry to determine a source of the delay, and responsive to determining the source of the delay, determining, by the one or more processors, a first shipping service provider participating in the logistics or the transportation of the object that is responsible for the source of the delay. Additionally, the method 400 may further include retrieving, by the one or more processors, contact information corresponding to the first shipping service provider, and causing, by the one or more processors, the user computing device to render the contact information as part of the workspace GUI. In these aspects, a user interacting with the contact information causes the user computing device to initiate contact between the user computing device and a first shipping service provider device of the first shipping service provider.

In certain aspects, the set of data entity information includes at least one of: (i) an order data entity, (ii) a container data entity, (iii) an inventory data entity, (iv) an asset data entity, (v) a location data entity, or (vi) a people data entity. Further in these aspects, the workspace cards of the workspace GUI include at least one of (i) an overview card, (ii) a route card, (iii) a map card, (iv) an activity feed card, (v) an order health information card, (vi) a nested shipments card, (vii) an inventory onboard card, or (viii) a route plan card.

In some aspects, the set of data entity information is a first set of data entity information, and the method 400 further includes receiving, at the one or more processors, a user interaction indicating a selection of a combination function, the selection indicating a second set of data entity information. Further in these aspects, the method 400 may include combining, by the one or more processors in response to the selection of the combination function, workspace cards associated with at least the first set of data entity information and the second set of data entity information into a combined workspace GUI. Additionally, in these aspects, the method 400 may include causing, by the one or more processors, the user computing device to render the combined workspace GUI. Moreover, in these aspects, the combined workspace GUI includes at least (i) an overview card corresponding to both of the first set of data entity information and the second set of data entity information, and one or both of (ii) a map card corresponding to one or both of the first set of data entity information and the second set of data entity information or (iii) a route card corresponding to one or both of the first set of data entity information and the second set of data entity information.

Of course, it is to be appreciated that the actions of the method 400 may be performed in any suitable order and any suitable number of times.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present).

Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for retrieving and analyzing shipping data and rendering interfaces associated therewith, the method comprising:

receiving, at one or more processors, an indication of a reference key from a user computing device;

aggregating, by the one or more processors utilizing one or more application programming interfaces (APIs) from a set of APIs, a set of data entity information from two or more shipping service provider devices associated with two or more different shipping service providers, the set of data entity information corresponding to the reference key and including real-time data from each shipping service provider participating in logistics or transportation of an object included in the set of data entity information along a transportation route;

partitioning, by the one or more processors executing a workspace application, the set of data entity information into multiple workspace cards, each workspace card providing a different portion of the set of data entity information;

combining, by the one or more processors, at least two of the multiple workspace cards into a combined workspace (GUI), the at least two workspace cards being associated with a first shipping service provider and a second shipping service provider of the two or more shipping service providers;

determining, by the one or more processors based on a size of the multiple workspace cards, to transmit the multiple workspace cards to the user computing device in a single signal or a plurality of signals;

transmitting, by the one or more processors, the multiple workspace cards to the user computing device in the single signal or the plurality of signals; and causing, by the one or more processors, the user computing device to render the combined workspace GUI for access by a user of the user computing device in the workspace application, wherein the combined workspace GUI includes: (i) an overview card corresponding to the set of data entity information associated with the first shipping service provider and the second shipping service provider, (ii) a map card corresponding to the set of data entity information associated with the first shipping service provider and the second shipping service provider, and (iii) a route card corresponding to the set of data entity information associated with the first shipping service provider and the second shipping service provider.

2. The method of claim 1, further comprising:

generating, by the one or more processors, a predicted value for one or more entries included in the at least two workspace cards; and causing, by the one or more processors, the user computing device to render a predicted value graphical indication within the at least two workspace cards of the workspace GUI.

3. The method of claim 1, further comprising:

determining, by the one or more processors, that a first entry in the set of data entity information indicates a delay has taken place along the transportation route;

generating, by the one or more processors, a graphical indication of the delay for display in a map card of the multiple workspace cards; and causing, by the one or more processors, the user computing device to render at least the map card of the multiple workspace cards as part of the workspace GUI.

4. The method of claim 3, further comprising:

analyzing, by the one or more processors, the first entry to determine a source of the delay;

responsive to determining the source of the delay, determining, by the one or more processors, a first shipping service provider participating in the logistics or the transportation of the object that is responsible for the source of the delay;

retrieving, by the one or more processors, contact information corresponding to the first shipping service provider; and causing, by the one or more processors, the user computing device to render the contact information as part of the workspace GUI, wherein a user interacting with the contact information causes the user computing device to initiate contact between the user computing device and a first shipping service provider device of the first shipping service provider.

5. The method of claim 1, wherein
the set of data entity information includes at least one of: (i) an order data entity, (ii) a container data entity, (iii) an inventory data entity, (iv) an asset data entity, (v) a location data entity, or (vi) a people data entity; and
the workspace cards of the workspace GUI include at least one of (i) an overview card, (ii) a route card, (iii) a map card, (iv) an activity feed card, (v) an order health information card, (vi) a nested shipments card, (vii) an inventory onboard card, or (viii) a route plan card.

6. A system for retrieving and analyzing shipping data and rendering interfaces associated therewith, the system comprising:
one or more processors; and
one or more memories communicatively coupled with a user interface and the one or more processors, the one or more memories storing computer executable instructions thereon that, when executed by the one or more processors, cause the one or more processors to:
receive an indication of a reference key from a user computing device,
aggregate, by utilizing one or more application programming interfaces (APIs), a set of data entity information from two or more shipping service provider devices associated with two or more different shipping service providers, the set of data entity information corresponding to the reference key and including real-time data from each shipping service provider participating in logistics or transportation of an object included in the set of data entity information along a transportation route,
partition the set of data entity information into multiple workspace cards, each workspace card providing a different portion of the set of data entity information,
combine at least two of the multiple workspace cards into a combined workspace (GUI), the at least two workspace cards being associated with a first shipping service provider and a second shipping service provider of the two or more shipping service providers,
determine, based on a size of the multiple workspace cards, to transmit the multiple workspace cards to the user computing device in a single signal or a plurality of signals,
transmit the multiple workspace cards to the user computing device in the single signal or the plurality of signals, and
cause the user computing device to render the combined workspace GUI for access by a user of the user computing device in the workspace application, wherein the combined workspace GUI includes: (i) an overview card corresponding to the set of data entity information associated with the first shipping service provider and the second shipping service provider, (ii) a map card corresponding to the set of data entity information associated with the first shipping service provider and the second shipping service provider, and (iii) a route card corresponding to the set of data entity information associated with the first shipping service provider and the second shipping service provider.

7. The system of claim 6, wherein the instructions, when executed by the one or more processors, further cause the one or more processors to:
generate a predicted value for one or more entries included in the at least two workspace cards; and
cause the user computing device to render a predicted value graphical indication within the at least two workspace cards of the workspace GUI.

8. The system of claim 6, wherein the instructions, when executed by the one or more processors, further cause the one or more processors to:
determine that a first entry in the set of data entity information indicates a delay has taken place along the transportation route;
generate a graphical indication of the delay for display in a map card of the multiple workspace cards; and
cause the user computing device to render at least the map card of the multiple workspace cards as part of the workspace GUI.

9. The system of claim 8, wherein the instructions, when executed by the one or more processors, further cause the one or more processors to:
analyze the first entry to determine a source of the delay;
responsive to determining the source of the delay, determine a first shipping service provider participating in the logistics or the transportation of the object that is responsible for the source of the delay;
retrieve contact information corresponding to the first shipping service provider; and
cause the user computing device to render the contact information as part of the workspace GUI, wherein a user interacting with the contact information causes the user computing device to initiate contact between the user computing device and a first shipping service provider device of the first shipping service provider.

10. The system of claim 6, wherein
the set of data entity information includes at least one of: (i) an order data entity, (ii) a container data entity, (iii) an inventory data entity, (iv) an asset data entity, (v) a location data entity, or (vi) a people data entity; and
the workspace cards of the workspace GUI include at least one of (i) an overview card, (ii) a route card, (iii) a map card, (iv) an activity feed card, (v) an order health information card, (vi) a nested shipments card, (vii) an inventory onboard card, or (viii) a route plan card.

11. A tangible machine-readable medium comprising instructions that, when executed, cause a machine to at least:
receive an indication of a reference key from a user computing device;
aggregate, by utilizing one or more application programming interfaces (APIs), a set of data entity information from two or more shipping service provider devices associated with two or more different shipping service providers, the set of data entity information corresponding to the reference key and including real-time data from each shipping service provider participating in logistics or transportation of an object included in the set of data entity information along a transportation route;

partition the set of data entity information into multiple workspace cards, each workspace card providing a different portion of the set of data entity information;

combine at least two of the multiple workspace cards into a combined workspace (GUI), the at least two workspace cards being associated with a first shipping service provider and a second shipping service provider of the two or more shipping service providers;

determine, based on a size of the multiple workspace cards, to transmit the multiple workspace cards to the user computing device in a single signal or a plurality of signals;

transmit the multiple workspace cards to the user computing device in the single signal or the plurality of signals; and cause the user computing device to render the combined workspace GUI for access by a user of the user computing device in the workspace application, wherein the combined workspace GUI includes: (i) an overview card corresponding to the set of data entity information associated with the first shipping service provider and the second shipping service provider, (ii) a map card corresponding to the set of data entity information associated with the first shipping service provider and the second shipping service provider, and (iii) a route card corresponding to the set of data entity information associated with the first shipping service provider and the second shipping service provider.

12. The tangible machine-readable medium of claim 11, wherein the instructions, when executed, further cause the machine to:

generate a predicted value for one or more entries included in the at least two workspace cards; and cause the user computing device to render a predicted value graphical indication within the at least two workspace cards of the workspace GUI.

13. The tangible machine-readable medium of claim 11, wherein the instructions, when executed, further cause the machine to:

determine that a first entry in the set of data entity information indicates a delay has taken place along the transportation route;

generate a graphical indication of the delay for display in a map card of the multiple workspace cards; and cause the user computing device to render at least the map card of the multiple workspace cards as part of the workspace GUI.

14. The tangible machine-readable medium of claim 13, wherein the instructions, when executed, further cause the machine to:

analyze the first entry to determine a source of the delay;

responsive to determining the source of the delay, determine a first shipping service provider participating in the logistics or the transportation of the object that is responsible for the source of the delay;

retrieve contact information corresponding to the first shipping service provider; and cause the user computing device to render the contact information as part of the workspace GUI, wherein a user interacting with the contact information causes the user computing device to initiate contact between the user computing device and a first shipping service provider device of the first shipping service provider.

15. The tangible machine-readable medium of claim 11, wherein the set of data entity information includes at least one of: (i) an order data entity, (ii) a container data entity, (iii) an inventory data entity, (iv) an asset data entity, (v) a location data entity, or (vi) a people data entity; and the workspace cards of the workspace GUI include at least one of (i) an overview card, (ii) a route card, (iii) a map card, (iv) an activity feed card, (v) an order health information card, (vi) a nested shipments card, (vii) an inventory onboard card, or (viii) a route plan card.

16. The method of claim 1, further comprising:

determining, by the one or more processors based on the indication, that (i) the set of data entity information is contained at least on a first shipping service provider device of the two or more shipping service provider devices and a second shipping service provider device of the two or more shipping service provider devices, (ii) communicating with the first shipping service provider device is implemented through a first API of the set of APIs, and (ii communicating with the second shipping service provider device is implemented through a second API of the set of APIs; and aggregating, by the one or more processors, the set of data entity information at least partially from (i) the first shipping service provider device via the first API and (ii) the second shipping service provider device via the second API.

17. The system of claim 6, wherein the instructions, when executed by the one or more processors, further cause the one or more processors to:

determine, based on the indication, that (i) the set of data entity information is contained at least on a first shipping service provider device of the two or more shipping service provider devices and a second shipping service provider device of the two or more shipping service provider devices, (ii) communicating with the first shipping service provider device is implemented through a first API of the set of APIs, and (iii) communicating with the second shipping service provider device is implemented through a second API of the set of APIs; and aggregate the set of data entity information at least partially from (i) the first shipping service provider device via the first API and (ii) the second shipping service provider device via the second API.

18. The tangible machine-readable medium of claim 11, wherein the instructions, when executed, further cause the machine to:

determine, based on the indication, that (i) the set of data entity information is contained at least on a first shipping service provider device of the two or more shipping service provider devices and a second shipping service provider device of the two or more shipping service provider devices, (ii) communicating with the first shipping service provider device is implemented through a first API of the set of APIs, and (iii) communicating with the second shipping service provider device is implemented through a second API of the set of APIs; and aggregate the set of data entity information at least partially from (i) the first shipping service provider device via the first API and (ii) the second shipping service provider device via the second API.

* * * * *